United States Patent [19]

Radcliff

[11] Patent Number: 4,603,501
[45] Date of Patent: Aug. 5, 1986

[54] OAR LOCK POLE HOLDER

[76] Inventor: Donald C. Radcliff, 850 S. Lorraine Rd., Wheaton, Ill. 60187

[21] Appl. No.: 694,293

[22] Filed: Jan. 24, 1985

[51] Int. Cl.⁴ ............................................. A01K 97/10
[52] U.S. Cl. ...................................... 43/21.2; 248/538
[58] Field of Search ................... 43/21.2; 248/520, 538

[56] References Cited

U.S. PATENT DOCUMENTS

| D. 136,856 | 12/1943 | Olowecki | 43/21.2 |
| 2,602,618 | 7/1952 | Cohen | 43/21.2 |
| 3,154,274 | 10/1964 | Hillcourt | 43/21.2 |
| 3,570,793 | 3/1971 | Shackel | 43/21.2 |

*Primary Examiner*—Gene P. Crosby
*Attorney, Agent, or Firm*—Hill, Van Santen, Steadman & Simpson

[57] ABSTRACT

A fishing rod support for positioning and retaining a fishing pole or rod at a optimum inclined angle for fishing. The fishing rod support provides an enclosed loop member which freely receives a fishing rod handle therein and a spaced forked member to cradle the handle when it is lowered to the optimum inclined angle. As the handle is lowered it makes initial contact with axial spaced gripping areas on the loop and displaces the loop as it is lowered into the forked member to produce a biasing gripping hold on the fishing pole handle. A resilient connection between the loop member and the forked member allows for this displacement. A mounting post enables the fishing rod support to be seated in an oarlock of a boat.

9 Claims, 6 Drawing Figures

OAR LOCK POLE HOLDER

BACKGROUND OF THE INVENTION

1. Field of the Invention

This invention is directed to a device for supporting and retaining a fishing pole or rod at an optimum inclination for trolling or still fishing.

2. Description of the Prior Art

Fishing rod supports or rests have long been used to allow a fisherman to continue to fish while he attends to various other activities such as maneuvering a boat, working a second fishing line or simply to relax. These past rod supports usually provide a simple socket or closed end sleeve which was adapted to slidably receive the handle of a pole or rod in a loose supportive position. Typically these supports provide mounting holes for screws or nails to secure the supports to a suitable surface on a boat, pier or the like. Herein, the fishing rod handle is inserted into the sleeve portion of the support with the line supporting end of the rod cantilevered out over the water at a shallow angle so the fishing line extends a substantial distance out away from the support.

The rod receiving sleeve portion is sufficiently large to prevent wedging or binding of the handle and facilitates quick removal of the rod from the support when a fish takes the bait.

Accordingly, if the fishing line snags on an obstruction while trolling or when a large fish takes the bait, the entire fishing gear may be jerked out of the support and lost.

Accordingly, it would be a decided advance in the state of the art to provide a fishing rod support device which effectively supports a fishing rod at an ideal inclination and which secures the rod handle against unwanted removal from the support, yet which allows quick and easy removal when desired, and further, to provide a rod support device which need not be permanently attached to a mounting surface.

SUMMARY OF THE INVENTION

The present invention provides a fishing pole or rod support device which positions and secures the handle of a fishing rod in an ideal position, especially for troll fishing. The rod support device is adapted to be detachably mounted in a boat oarlock to extend above the top of the gunwale member in a secure manner. The support is made of a somewhat resilient plastic material and having a mounting post or leg dimensioned to seat into an oarlock with a spaced stabilizing leg extending downward about the outer surface of the gunwale to prevent twisting movement of the support in the oarlock. The support device includes stepped offset portions forming spaced loop and fork members interconnected by an arcuate portion which carries the mounting post and stabilizing leg. Opposed offset areas on the loop portion define bite areas which are arranged to grip or hold the rod handle when the rod is installed in the support. The offset fork portion also includes a bite area to help retain the fishing rod handle.

Although the loop portion is oversized to freely accept the entrance of rod handle, the bite areas are brought into effective action by a related orientation of the loop and fork member axes. That is, the axis of the loop is such that when the rod is inserted into the loop member and the cantilevered end of the rod allowed to assume a rest position in the fork member, the handle tilts relative to the axis of the loop portion to a point where contact is made on diametrically opposed sides of the loop at which points the bite areas are located. As the cantilevered rod comes to rest in the fork member, it displaces the loop member from its free state position to a biased position which substantially increases a holding force applied against the rod handle. The resilient arcuate interconnecting portion permits this displacement to occur and returns the loop member to its free state position when the rod is removed from the support. The stepped offset portions aid in molding the loop and fork members as well as minimizing the plastic material requirements.

It is therefore an object of the present invention to provide a fishing rod support device which will support and retain a fishing rod at a desirable inclination for trolling or still fishing.

It is a further object of the present invention to provide a fishing rod support device which is adapted to be carried in an oarlock of a boat.

It is still another object of the present invention to provide a fishing rod support which positively secures the rod handle from longitudinal and circumferential displacements yet provide quick and easy removal when desired.

Other objects, features and advantages of the present invention will be readily apparent from the following description of the preferred embodiment thereof taken in conjunction with the accompanying drawings, although variations and modifications may be effected without departing from the spirit and scope of the novel concepts of the disclosure.

DESCRIPTION OF THE PREFERRED EMBODIMENT

Figure 1:
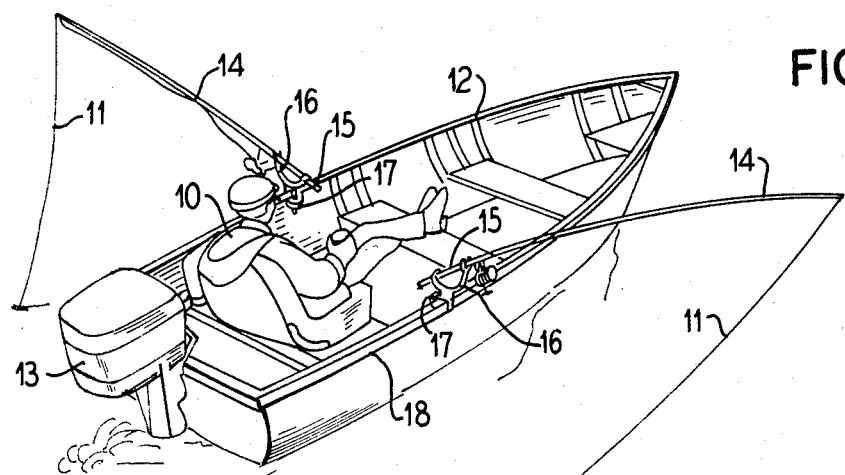
FIG. 1 is a perspective view of a small boat using supporting and retaining devices embodying features of this invention to hold a pair of fishing rods for troll fishing.
Figure 5:
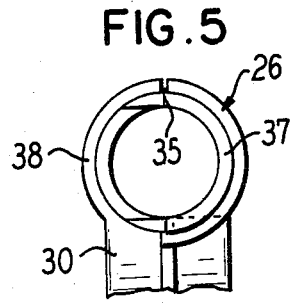
FIG. 5 is a fragmentary end view of the loop portion of the device.

In FIG. 1 there is shown a fisherman 10 trolling a pair of fishing lines 11 from a boat 12, powered by a motor 13. The lines 11 extend from fishing rods 14 which are cantilevered out over the water at a predetermined angle relative to the surface of the water. The fishing rods 14 are typically provided with a handle portion 15, lined with cork or other resilient material, and are shown held in an ideal position by a fishing rod support device 16. The support device 16 is in turn mounted in the oarlocks 17 of the boat 12. The oarlocks 17 are affixed to the boat sides adjacent to the gunwales 18.

Figure 2:
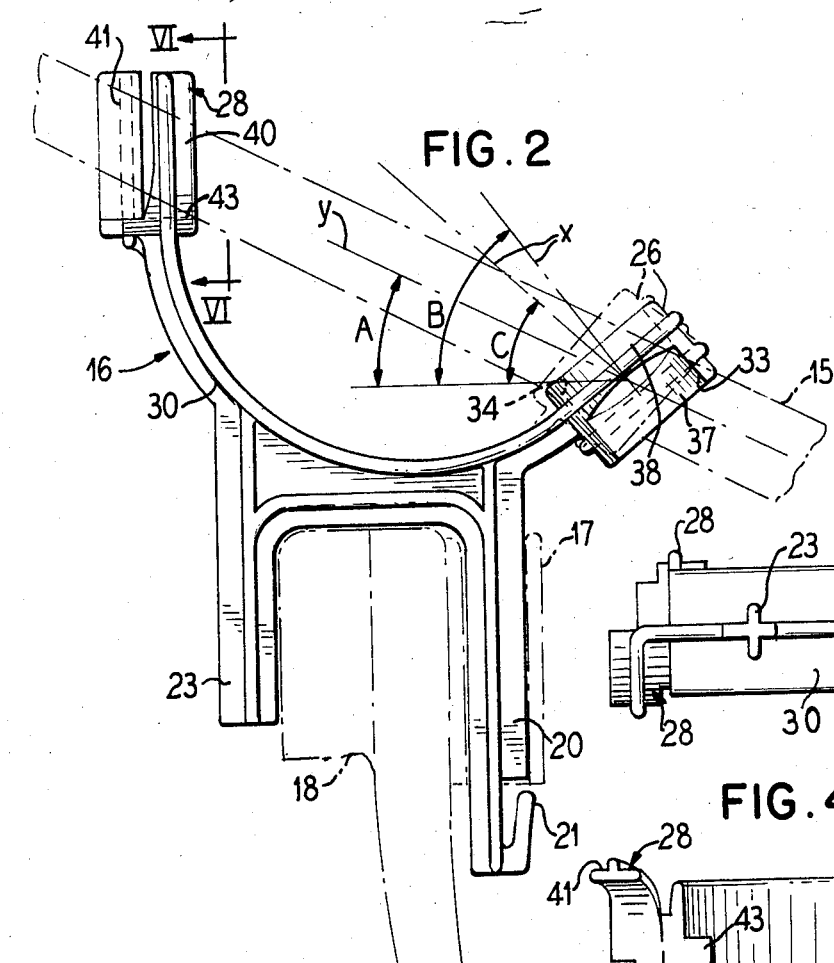
FIG. 2 is an enlarged side elevational view of the supporting and retaining device shown in FIG. 1.
Figure 6:
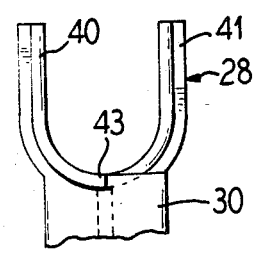
FIG. 6 is a fragmentary end view of the fork portion of the support device.

As best seen in FIG. 2, the fishing rod support 16 is provided with a mounting post 20 which is adapted to be fully inserted into the oarlock 17 wherein an integral retaining finger 21 projects from a lower end of the oarlock 17 to prevent accidental removal of the support device 16. Pressure applied to the resilient finger 21 will enable it to enter the tubular oarlock 17 and also allow it to be withdrawn from the top when desired. Preferably the fishing rod support device 16 is formed of a tough resilient molded plastic and includes a downward extending stabilizing leg 23, spaced from the mounting post 20, and arranged to lay downward alongside the boat's gunwales 18 to prevent the support device from pivoting in the oarlocks 17. The mounting post 20 may also serve to seat the support device 16 in a suitable pipe or tube secured to a pier or driven into the ground when not fishing from a boat.

The support device 16 further includes a retaining loop 26 and a forked rest 28 which are spaced from one another and interconnected by a resilient arcuate portion 30. The mounting post 20 and stabilizing leg 23 depend from a midportion of the arcuate portion. The loop 26 and forked rest 28 support the fishing rod 14 in an ideal fishing posture.

It can be seen in FIG. 2 that the retaining loop 26 is attached to the arcuate portion 30 whereby its axis 'x' is disposed at an angle 'B' relative to the horizon, which is substantially greater than the angle of respose, angle 'A', of the fishing rod 14. The inner diameter of the retaining loop 26 is substantially larger than the handle 15 of the fishing rod 14 to permit easy insertion along the axis 'x'. After the handle is inserted into the loop, the cantilevered portion of the rod 14 is lowered into the forked rest 28. Herein, the axis of the rod moves from a position parallel with the loop axis 'x' to a position 'y'. Thus the rod is inserted into the retaining loop 26 at an angle 'B' and is lowered to its desired fishing position angle 'A'.

It will be seen that when lowering the fishing rod 14 toward the forked rest 28, the handle 15 makes contact with opposed, spaced retaining areas 33, 34 of the loop 26, causing the loop to deflect from its free relaxed position (solid lines in FIG. 2) to the biased broken line position of FIG. 2. Thus, when the rod 14 is in a supported fishing position, the axis 'x' of the retaining loop 26 is deflected downward to an angle 'C'. It will be understood that the weight of the cantilevered rod holds the retaining loop 26 in the deflected position wherein a restraining grip or bite is placed on the rod's resilient handle 15. This restraining bite secures the rod in the support 16 until the rod is again lifted to an elevated position. Herein, the resilient arcuate member 30 enables the loop 26 to deflect to its fishing rod retaining position and returns the loop to its relaxed unbiased position when the rod is removed from the support device 16.

Thus it will be seen that the retaining areas 33, 34 apply a constant biasing pressure on the handle 15 in which right angled edge portions 35, 36, defining the retaining areas, are pressed into the resilient surface of the handle to produce the restraining bite. Displacement of the handle 15 in both an axial and in a circumferential direction is accordingly prevented while the rod is supported in the device 16.

Figure 3:
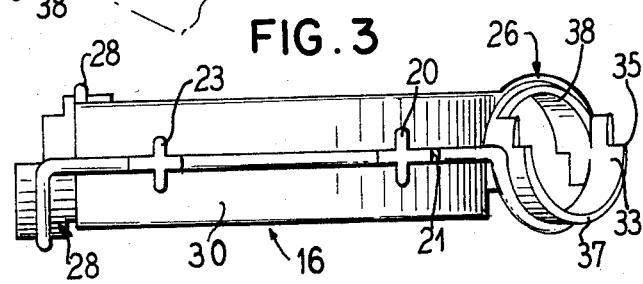
FIG. 3 is a bottom elevational view of the device shown in FIG. 2.
Figure 4:
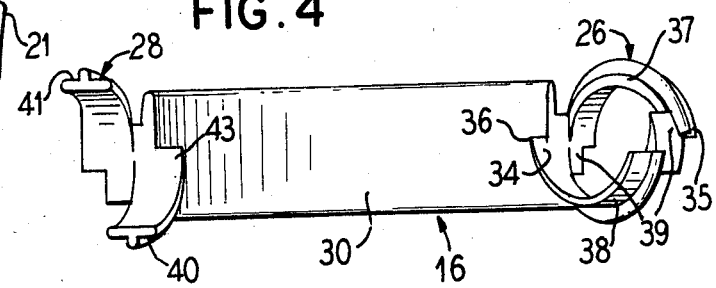
FIG. 4 is a top elevational view of the device shown in FIG. 2.

As best seen in FIGS. 3 and 4, the retaining loop 26 comprises an offset construction in which a semi-circular portion 37 extends laterally in one direction while a second semi-circular portion 38 extends laterally in an opposite direction. The portions 37 and 38 are joined together at interconnecting areas 39 to form the enclosed loop 26. This offset construction not only provides the retaining edge portions but also conserves on plastic material requirements and greatly simplifies the injection molding procedure. The forked rest 28 is also formed with an offset configuration having spaced vertical retaining legs 40 and 41 to receive the fishing rod 14 and providing a right angled edge portion 43, similar to the edge portions 36, which also helps in preventing accidental removal of the rod from the support device 16.

It will be seen that various sized fishing rod handles and poles can be accommodated by the present invention and a retaining grip achieved so long as contact is made between the gripping or retaining areas 33, 34 and the handle before the fishing rod is brought to a full rest position in the forked rest 28. Accordingly, the displacement of the retaining loop axis 'x' will somewhat depend on the diameter of the handle utilized by a fisherman. Herein, the resilient arcuate member 30 is arranged to accommodate the required displacement of retaining loop 26.

Although the teachings of my invention has herein been discussed with reference to a specific embodiment, it is to be understood that these are by way of illustration and that variations and modifications may be effected without departing from the spirit and scope of the novel concepts of my invention.

I claim as my invention:

1. A fishing rod support for retaining and positioning a fishing rod in a desirable orientation for catching fish comprising:

a mounting means to detachably mount said fishing rod support in a desired location;

a support loop means being of a sufficient size to freely receive a fishing rod handle therein, and including offset diametrically opposed gripping areas;

a forked rest means spaced from said support loop means and adapted to cradle an extending portion of said fishing rod handle at a predetermined inclined angle; and means to interconnect said support loop means and said forked rest means in an aligned and predisposed angular relationship relative to one another, said support loop means comprises a pair of semi-circular portions interconnected in an axial offset orientation thereby defining said opposed gripping areas and having an axis extending at an inclined angle substantially greater than said predetermined inclined angle, whereby when said fishing rod handle is inserted into said support loop means and said extending portion of said handle is cradled by said forked rest means at said predetermined inclined angle, said opposed gripping areas of said support loop means make gripping contact with said fishing rod handle.

2. The fishing rod support of claim 1, wherein said fishing rod handle when cradled in said forked rest means, displaces the axis of said support loop means to provide a biased gripping contact of the opposed gripping areas against the fishing rod handle and wherein said means to interconnect said support loop means and said forked rest means comprises a resilient member to accommodate displacement of said axis.

3. The fishing rod support of claim 2, wherein said mounting means includes a mounting post depending from said resilient members and adapted to be seated in an oarlock of a boat.

4. The fishing rod support of claim 3, wherein said mounting post includes a retaining means to prevent accidental removal of said fishing rod support from said oarlock.

5. The fishing rod support of claim 3, wherein said mounting post includes an integral resilient retaining finger extending from a lower portion of said mounting post to prevent accidental removal of said fishing rod support from said oarlock.

6. The fishing rod support of claim 4, wherein said mounting means further includes a stabilizing leg spaced from said mounting post and arranged to extend downward along a boat's gunwale to stabilize the fishing rod support when mounted in an oarlock.

7. The fishing rod support of claim 1, wherein said opposed gripping areas comprise right angled edge portions which are pressed against the fishing rod handle when said handle is cradled in said forked rest means to prevent axial and circumferential displacement of said fishing rod relative to said fishing rod support.

8. A fishing rod support for retaining and supporting a fishing rod in a predetermined inclined angle for catching fish comprising:

a mounting means to detachably mount said fishing rod support in an oarlock of a boat;

an elongated resilient means carried by said mounting means;

a support loop means carried by said elongated resilient means and being of a sufficient size to freely receive a fishing rod handle therein and including axially offset, diametrically opposed retaining areas; and a forked rest means carried by said elongated resilient means in an aligned spaced relationship relative to said support loop means and adapted to cradle an extending portion of said fishing rod handle in said predetermined inclined angle, whereby when a fishing rod handle is inserted into said support loop means and said extending portion of said fishing rod handle is lowered into said forked rest means the fishing rod handle makes gripping contact with said axially offset and diametrically opposed retaining areas of said support loop means.

9. The fishing rod support of claim 8, wherein said fishing rod handle makes initial contact with said diametrically opposed retaining areas before the extending portion is fully cradled in said forked rest means and wherein said elongated resilient means permits displacement of said support loop means to allow said extending portion to assume said predetermined inclined angle.

* * * * *